United States Patent
Li et al.

(10) Patent No.: US 8,705,205 B1
(45) Date of Patent: Apr. 22, 2014

(54) MAGNETIC RECORDING HEAD HAVING A DUAL SIDEWALL ANGLE

(75) Inventors: Yunfei Li, Fremont, CA (US); Lijie Guan, Milpitas, CA (US); Ying Hong, Morgan Hill, CA (US); Zhigang Bai, Milpitas, CA (US); Jinqiu Zhang, Fremont, CA (US); Yugang Wang, Milpitas, CA (US); Feng Liu, San Ramon, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 80 days.

(21) Appl. No.: 13/169,685

(22) Filed: Jun. 27, 2011

(51) Int. Cl.
*G11B 5/127* (2006.01)

(52) U.S. Cl.
USPC .................................. 360/125.13; 360/123.14

(58) Field of Classification Search
USPC ............... 360/125.09, 125.1, 125.11, 125.13, 360/125.14, 125.15, 125.03
See application file for complete search history.

(56) References Cited

U.S. PATENT DOCUMENTS

| | | | |
|---|---|---|---|
| 5,801,910 A * | 9/1998 | Mallary | ............ 360/125.65 |
| 6,172,848 B1 | 1/2001 | Santini | |
| 6,504,675 B1 | 1/2003 | Shukh et al. | |
| 6,710,973 B2 | 3/2004 | Okada et al. | |
| 6,722,018 B2 | 4/2004 | Santini | |
| 6,731,460 B2 | 5/2004 | Sasaki | |
| 6,738,223 B2 | 5/2004 | Sato et al. | |
| 6,762,911 B2 | 7/2004 | Sasaki et al. | |
| 6,813,116 B2 | 11/2004 | Nakamura et al. | |
| 6,829,819 B1 | 12/2004 | Crue, Jr. et al. | |
| 6,857,181 B2 | 2/2005 | Lo et al. | |
| 6,870,712 B2 | 3/2005 | Chen et al. | |
| 6,891,697 B2 | 5/2005 | Nakamura et al. | |
| 6,903,900 B2 | 6/2005 | Sato et al. | |
| 6,912,106 B1 | 6/2005 | Chen et al. | |
| 6,944,938 B1 | 9/2005 | Crue, Jr. et al. | |
| 6,947,255 B2 | 9/2005 | Hsiao et al. | |
| 6,950,277 B1 | 9/2005 | Nguy et al. | |
| 6,952,325 B2 * | 10/2005 | Sato et al. | ............. 360/125.08 |
| 6,975,486 B2 | 12/2005 | Chen et al. | |
| 6,995,949 B2 * | 2/2006 | Nakamura et al. | ......... 360/125.13 |
| 7,006,326 B2 | 2/2006 | Okada et al. | |
| 7,070,698 B2 | 7/2006 | Le | |
| 7,100,266 B2 | 9/2006 | Plumer et al. | |
| 7,133,252 B2 | 11/2006 | Takano et al. | |
| 7,133,253 B1 | 11/2006 | Seagle et al. | |
| 7,139,153 B2 | 11/2006 | Hsiao et al. | |
| 7,159,302 B2 | 1/2007 | Feldbaum et al. | |
| 7,185,415 B2 | 3/2007 | Khera et al. | |
| 7,206,166 B2 | 4/2007 | Notsuke et al. | |
| 7,212,379 B2 | 5/2007 | Hsu et al. | |
| 7,245,454 B2 * | 7/2007 | Aoki et al. | ................ 360/125.1 |
| 7,251,878 B2 | 8/2007 | Le et al. | |
| 7,253,992 B2 | 8/2007 | Chen et al. | |
| 7,296,338 B2 | 11/2007 | Le et al. | |

(Continued)

*Primary Examiner* — Brian Miller (57) ABSTRACT

A magnetic transducer having an air-bearing surface (ABS) is described. The magnetic transducer includes a pole and at least one coil for energizing the pole. The pole has a pole tip proximate to the ABS, a yoke distal from the ABS, and a bottom surface including a bottom bevel. At least the yoke includes at least one sidewall having a first angle and a second angle. The first angle is between the bottom surface and the at least one sidewall. The second angle is a constant distance along the at least one sidewall from the first angle.

17 Claims, 8 Drawing Sheets

(56) References Cited

U.S. PATENT DOCUMENTS

| | | | |
|---|---|---|---|
| 7,324,304 B1 | 1/2008 | Benakli et al. | |
| 7,369,359 B2 | 5/2008 | Fujita et al. | |
| 7,392,577 B2 | 7/2008 | Yazawa et al. | |
| 7,430,095 B2 | 9/2008 | Benakli et al. | |
| 7,441,325 B2 | 10/2008 | Gao et al. | |
| 7,464,457 B2 | 12/2008 | Le et al. | |
| 7,469,467 B2 | 12/2008 | Gao et al. | |
| 7,508,626 B2 | 3/2009 | Ichihara et al. | |
| 7,535,675 B2 | 5/2009 | Kimura et al. | |
| 7,558,019 B2 | 7/2009 | Le et al. | |
| 7,580,222 B2 | 8/2009 | Sasaki et al. | |
| 7,639,451 B2 | 12/2009 | Yatsu et al. | |
| 7,639,452 B2 | 12/2009 | Mochizuki et al. | |
| 7,643,246 B2 * | 1/2010 | Yazawa et al. | 360/125.2 |
| 7,663,839 B2 | 2/2010 | Sasaki et al. | |
| 7,672,079 B2 | 3/2010 | Li et al. | |
| 7,726,009 B1 | 6/2010 | Liu et al. | |
| 7,748,104 B2 | 7/2010 | Bonhote et al. | |
| 7,796,360 B2 * | 9/2010 | Im et al. | 360/125.13 |
| 7,796,361 B2 * | 9/2010 | Sasaki et al. | 360/125.13 |
| 7,841,068 B2 | 11/2010 | Chen et al. | |
| 7,916,425 B2 * | 3/2011 | Sasaki et al. | 360/125.15 |
| 7,924,528 B2 * | 4/2011 | Sasaki et al. | 360/125.15 |
| 8,027,125 B2 | 9/2011 | Lee et al. | |
| 8,116,033 B2 * | 2/2012 | Kameda et al. | 360/125.1 |
| 8,125,732 B2 * | 2/2012 | Bai et al. | 360/125.09 |
| 8,141,235 B1 | 3/2012 | Zhang | |
| 8,149,536 B1 | 4/2012 | Yang et al. | |
| 8,184,399 B2 * | 5/2012 | Wu et al. | 360/125.15 |
| 8,233,233 B1 * | 7/2012 | Shen et al. | 360/125.03 |
| 8,233,234 B2 * | 7/2012 | Hsiao et al. | 360/125.09 |
| 8,233,235 B2 * | 7/2012 | Chen et al. | 360/125.15 |
| 8,248,728 B2 * | 8/2012 | Yamaguchi et al. | 360/125.09 |
| 8,254,060 B1 * | 8/2012 | Shi et al. | 360/125.1 |
| 8,264,792 B2 | 9/2012 | Bai et al. | |
| 8,270,109 B2 | 9/2012 | Ohtsu | |
| 8,289,649 B2 * | 10/2012 | Sasaki et al. | 360/125.13 |
| 8,305,711 B2 * | 11/2012 | Li et al. | 360/125.31 |
| 8,320,076 B1 | 11/2012 | Shen et al. | |
| 8,347,488 B2 | 1/2013 | Hong et al. | |
| 8,400,731 B1 | 3/2013 | Li et al. | |
| 2003/0076630 A1 | 4/2003 | Sato et al. | |
| 2004/0061988 A1 | 4/2004 | Matono et al. | |
| 2004/0184191 A1 | 9/2004 | Ichihara et al. | |
| 2005/0117251 A1 * | 6/2005 | Matono et al. | 360/126 |
| 2006/0044677 A1 * | 3/2006 | Li et al. | 360/122 |
| 2006/0158779 A1 | 7/2006 | Ota et al. | |
| 2006/0174474 A1 | 8/2006 | Le | |
| 2006/0225268 A1 | 10/2006 | Le et al. | |
| 2006/0288565 A1 | 12/2006 | Le et al. | |
| 2007/0211380 A1 | 9/2007 | Akimoto et al. | |
| 2007/0236834 A1 | 10/2007 | Toma et al. | |
| 2007/0247746 A1 | 10/2007 | Kim et al. | |
| 2007/0258167 A1 | 11/2007 | Allen et al. | |
| 2007/0263324 A1 | 11/2007 | Allen et al. | |
| 2007/0283557 A1 | 12/2007 | Chen et al. | |
| 2008/0002309 A1 | 1/2008 | Hsu et al. | |
| 2008/0151437 A1 | 6/2008 | Chen et al. | |
| 2009/0279206 A1 | 11/2009 | Yang et al. | |
| 2010/0146773 A1 | 6/2010 | Li et al. | |
| 2010/0277832 A1 | 11/2010 | Bai et al. | |
| 2011/0051293 A1 | 3/2011 | Bai et al. | |
| 2011/0222188 A1 | 9/2011 | Etoh et al. | |
| 2012/0268845 A1 | 10/2012 | Sahoo et al. | |

\* cited by examiner

MAGNETIC RECORDING HEAD HAVING A DUAL SIDEWALL ANGLE

BACKGROUND

Figure 1:
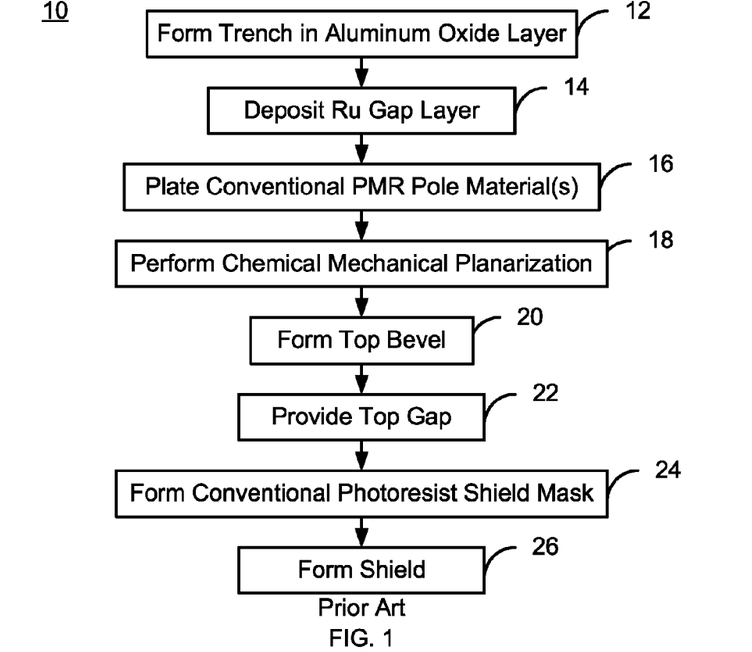
FIG. 1 is a flow chart depicting a conventional method for fabricating a PMR transducer.

FIG. 1 is a flow chart depicting a conventional method 10 for fabricating a conventional perpendicular magnetic recording (PMR) transducer. For simplicity, some steps are omitted. The conventional method 10 is used for providing a PMR pole in an aluminum oxide layer. A trench is formed in the aluminum oxide layer, via step 12. The top of the trench is wider than the trench bottom. As a result, the PMR pole formed therein will have its top surface wider than its bottom. Consequently, the sidewalls of the PMR pole will have a reverse angle. The bottom of the trench may also be sloped to provide a leading edge bevel. A Ru gap layer is deposited, via step 14. The Ru gap layer is used in forming a side gap. Step 14 typically includes depositing the Ru gap layer using chemical vapor deposition (CVD). The conventional PMR pole materials are plated, via step 16. Step 16 may include plating ferromagnetic pole materials as well as seed and/or other layer(s). A chemical mechanical planarization (CMP) may then be performed, via step 18, to remove excess pole material(s). A top, or trailing edge, bevel may then be formed, via step 20. The write gap is deposited, via steps 22. A conventional photoresist shield mask is formed using conventional photolithography, via step 24. A wraparound shield is then deposited, via step 26.

Figure 2A:
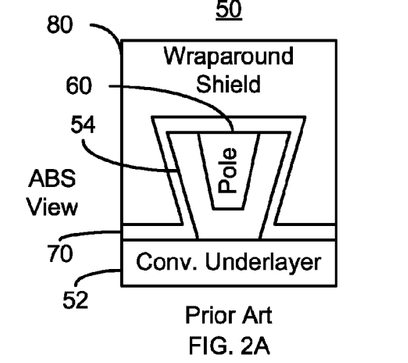
FIGS. 2A and 2B are diagrams depicting ABS and yoke views of a conventional PMR transducer.
Figure 2B:
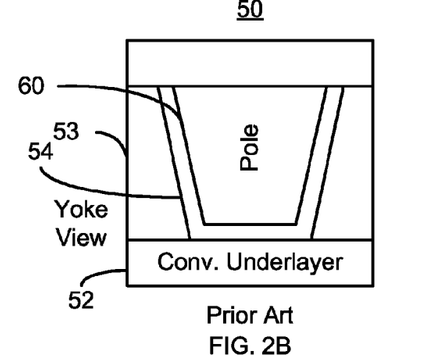

FIGS. 2A and 2B depict air-bearing surface (ABS) and yoke views, respectively, of a portion of a conventional PMR transducer 50 formed using the conventional method 10. FIGS. 2A and 2B are not to scale. The conventional transducer 50 includes a conventional underlayer 53 and a conventional intermediate layer 53. The intermediate layer 53 is the layer in which the pole 60 is formed. The Ru gap layer 54 which is deposited in the trench (not shown) is also depicted. The Ru gap layer 54 is thicker at the ABS. The conventional pole 60, write gap 70 and top shield 80 are also shown. The top shield 80 shown is a wraparound shield. Thus, using the conventional method 10, the pole 60 may be formed.

Although the conventional method 10 may provide the conventional PMR transducer 50, there may be drawbacks. At smaller track widths and device sizes, the write field capable of being produced by a smaller device may also be reduced. As a result, the conventional pole 60 may be unable to deliver a sufficiently high field at lower track widths. Accordingly, what is needed is an improved method for fabricating a PMR transducer.

SUMMARY

A magnetic transducer having an air-bearing surface (ABS) is described. The magnetic transducer includes a pole and at least one coil for energizing the pole. The pole has a pole tip proximate to the ABS, a yoke distal from the ABS, and a bottom surface including a bottom bevel. At least the yoke includes at least one sidewall having a first angle and a second angle. The first angle is between the bottom surface and the at least one sidewall. The second angle is a constant distance along the at least one sidewall from the first angle.

DETAILED DESCRIPTION OF THE PREFERRED EMBODIMENTS

Figure 3:
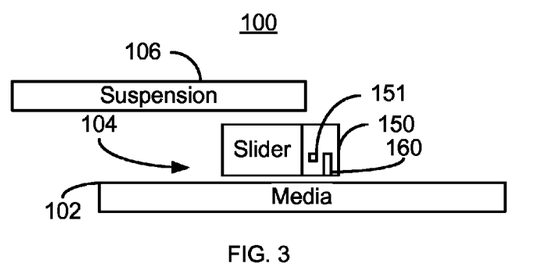
FIG. 3 depicts an exemplary embodiment of a magnetic recording disk drive.

FIG. 3 depicts an exemplary embodiment of a disk drive. The disk drive 100 includes media 102, slider 104, and suspension 106. Also shown is slider 104 held in place by suspension 106. An exemplary embodiment of a magnetic recording transducer 150 is also shown. The magnetic recording transducer 150 includes at least the pole 160 and coil(s) 151 for energizing the pole.

Figure 4A:
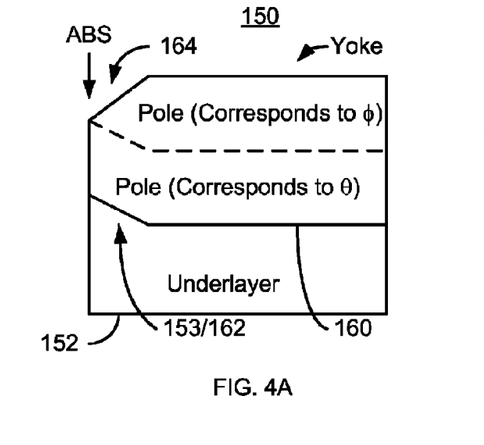
FIGS. 4A, 4B, 4C, and 4D are side, ABS, yoke, and top views of an exemplary embodiment of a PMR transducer.
Figure 4B:
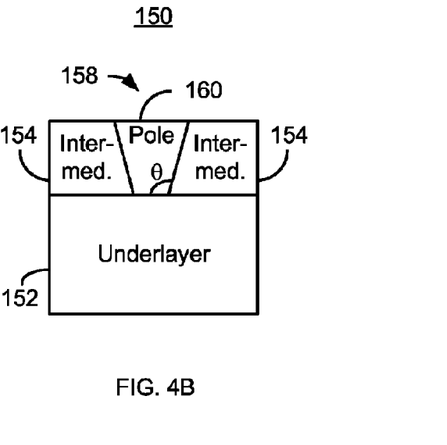
Figure 4C:
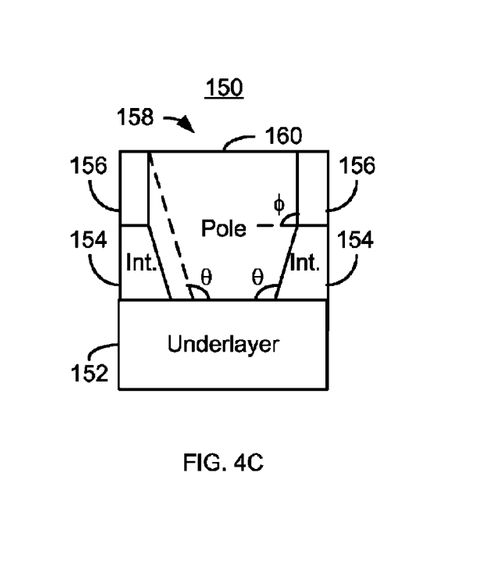
Figure 4D:
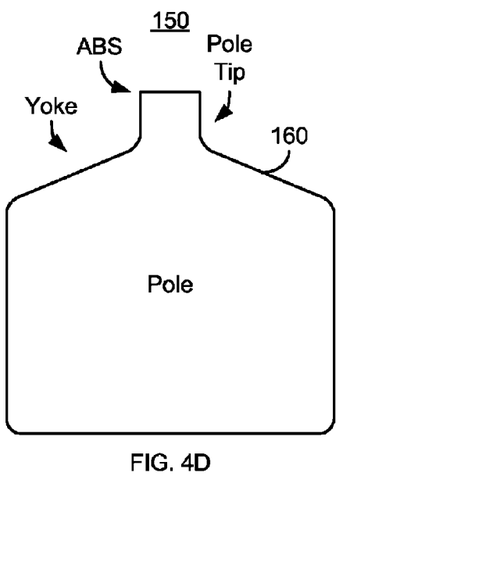

FIGS. 4A, 4B, 4C and 4D are diagrams depicting side, ABS, yoke, and top views of an exemplary embodiment of a portion of a PMR transducer 150. For clarity, FIGS. 4A, 4B, 4C and 4D are not to scale. FIG. 4A depicts the transducer 150 from the side (i.e. is a side view). FIG. 4B depicts the transducer 150 from the ABS (i.e. is an ABS view), while FIG. 4C depicts the transducer 150 from the yoke (i.e. is a yoke view). FIG. 4D depicts a top view indicating the ABS and yoke portions of the transducer 150. The transducer 150 is also described in the context of particular layers. However, in some embodiments, such layers may include sub-layers. In one embodiment, the method 100 commences after formation of the layer(s) on which the PMR pole resides. The transducer includes an underlayer 152, an intermediate layer 154, a hard mask layer 156, and a pole 160. In other embodiments, the intermediate layer 154 and hard mask layer 156 may be replaced by a single layer, other multilayers or another structure.

The underlayer 152 has a bevel 153 and a yoke region. The bevel 153 is closer to the ABS than the yoke region and is thicker than the yoke region. For example, the bevel 153 may be approximately 2600 Angstroms thick at the ABS, while the yoke region may be approximately 1300 Angstroms thick. However, other thicknesses may be used. The bevel 153 is thus sloped at an angle greater than zero and less than ninety degrees from the ABS. In some embodiments, the bevel 153 in the underlayer 152 is separated from the ABS by a short portion perpendicular to the ABS. In some embodiments, the underlayer 152 is nonmagnetic. In other embodiments, the underlayer 152 may be magnetic. In such embodiments, a nonmagnetic gap is provided at least between the underlayer 152 and the pole 160.

In the embodiment shown, the intermediate layer 154 is substantially conformal with the underlayer 152. Stated differently, the top surface of the intermediate layer 154 has a topology that is substantially the same as the top surface of the underlayer 152. The thickness of the intermediate layer 154 is thus substantially constant above the bevel 153 and the yoke region of the underlayer 152. For example, in some embodiments, the thickness of the intermediate layer 154 is approximately 1300 Angstroms throughout the intermediate layer 154. The intermediate layer 154 is also nonmagnetic and, in some embodiments, insulating. In some embodiments, the intermediate layer 154 includes aluminum oxide. In some such embodiments, the intermediate layer 154 consists of aluminum oxide.

The hard mask layer 156 is on the intermediate layer 154. One portion of the hard mask layer 156 has a top surface substantially perpendicular to the ABS while another portion has a bevel 164. In some embodiments, however, the bevel 164 may be omitted. In such embodiments, the entire top surface of the hard mask layer 156 may be perpendicular to the ABS. Thus, the topology of the top of the hard mask layer 156 may be substantially flat even though the hard mask layer 156 is above the topology of the underlayer 152 and the intermediate layer 154. The hard mask 156 is, therefore, not conformal to underlying layer(s). In some embodiments, the hard mask layer 156 is desired to be removable using a different process than the intermediate layer 154. For example, materials such as Cr may be used for the hard mask layer 156. The hard mask layer 156 is also desired to be thick. For example, the portion of the hard mask layer 156 above the yoke of the underlayer 152 may be on the order of 2600 Angstroms thick. In some embodiments, the hard mask layer 156 and/or the intermediate layer 154 may have multiple sublayers. In such embodiments, each sublayer may serve as a hard mask for the layer below. In some embodiments, these sublayers are conformal to the layer below except for the top sublayer. The top sublayer, and thus the top of the hard mask 156 is still desired to be flat. However, formation of bevel 164 in the pole 160 may also form a bevel 164 in the hard mask 156.

The trench 158 has been formed in the intermediate layer 154 and the hard mask layer 156. A pole 160 has been formed in the trench 158. In some embodiments, the pole 160 is a PMR pole. In the embodiment shown, the entire pole 160 is within the trench 158. However, in other embodiments, a portion of the pole 160 may be outside of the trench 158. The pole 160 includes a ferromagnetic material that may have a high saturation magnetization. In some embodiments, a seed layer (not explicitly shown) also resides in the trench. If the seed layer is magnetic, then the seed layer may be considered part of the pole 160. However, if a nonmagnetic seed layer is used, then the pole 160 is considered separate from the seed layer.

The pole 160 has a pole tip proximate to the ABS, a yoke distal from the ABS, and a bottom bevel corresponding 162 to the bevel 153 in the underlayer 152. The pole 160 includes sidewalls. At least the yoke of the pole 160, each of the sidewalls has multiple sidewall angles. As can be seen in FIGS. 4B and 4C, the pole 160 has two sidewall angles θ and φ in the yoke region. The sidewall angle θ is the angle between the bottom of the pole 160 and the lower portion of the sidewalls. In the embodiments shown, this portion of the sidewalls corresponds to the intermediate layer 154. The sidewall angle θ is the second angle for the pole 160. In the embodiment shown, this angle corresponds to the hard mask layer 156. The sidewall angle θ is a constant distance from the bottom of the pole 160. The sidewall angle θ is measured from a direction parallel to the bottom of the pole. The pole 160 has one (bottom) sidewall angle, θ, at the ABS. Although depicted on only one sidewall, in the embodiments shown, both sidewalls have the sidewall angles θ and φ. However, the sidewall angles on opposite sides of the pole 160 need not be the same. Further, the sidewall angles θ and φ may be different (as is shown) or the same. Finally, the yoke view and ABS view depict the pole 160 has having the same sidewall angles. However, in other embodiments, the yoke of the pole and the pole tip at the ABS may have different sidewall angles. In the embodiment shown, the sidewall angle θ is ninety degrees from the bottom surface of the pole. For example, in some embodiments, the angle, θ is within three degrees from normal to the bottom surface of the pole 160. The bottom angle, θ, is approximately one hundred degrees or larger (e.g. at least ten degrees from the normal to the bottom surface of the pole 160). In some embodiments, the bottom angle, θ is approximately one hundred and two degrees.

In some embodiments, the layers 154 and 156 surrounding the pole tip may be removed and replaced by a gap layer and wraparound or side shield. Such shields would penetrate only a short distance from the ABS. For example, in such an embodiment, the shields would be present in the ABS view of FIG. 4B, but not in the yoke view of FIG. 4C. Further, as discussed above, the sidewall angles θ and φ shown as corresponding to the intermediate layer 154 and hard mask layer 156 might be formed for another reason.

Because the sidewall angle φ is a constant distance from the bottom of the pole 160, the portion of the pole 160 above the sidewall angle φ increases through the bevel 162. This can be seen by a comparison of the pole 160 at the ABS as seen in FIG. 4B and the pole 160 at the yoke as seen in FIG. 4C. Thus, in addition to having multiple sidewall angles, the pole 160 has a first portion having a constant thickness and corresponding to the distance between the sidewall angles θ and φ. The pole 160 also has a second portion having a varying thickness corresponding to the distance between the top of the pole 160 and the sidewall angle θ. The distinction between these two portions of the pole 160 are shown by a dashed line in FIG. 4A.

The transducer 150 may have improved performance. The pole 160 has multiple sidewall angles at least in the yoke region. As a result, a greater amount of magnetic material may be provided in the pole 160 without significantly altering the width of the device. For example, suppose the width of the device at the yoke is set as a design parameter. Multiple sidewall angles at the yoke allow for the pole 160 to contain more magnetic material while maintaining the width. This can be seen in FIG. 4C. The dashed line at angle θ shown corresponds to a sidewall for a pole having a single sidewall angle and the same top width as the pole 160. The space between the sidewall of the pole 160 and the dashed line represents the additional magnetic material in the pole 160. This increase in magnetic material translates to a higher field that can be provided by the pole 160. Further, the track width at the ABS may be maintained. The higher field may translate to an improved reverse overwrite (ReOVW). The pole 160 may also have an improved magnetic field gradient, which may increase the signal to noise ratio (SNR). In some embodiments, the off track field may be maintained. In addition, the pole 160 may have an increased pole tip magnetic volume. This may improve cross track magnetic anisotropy, thereby mitigating domain lockup. Further, the transducer 150 is consistent with current fabrication techniques. In some embodiments, in which the pole 160 has multiple sidewall angles at the ABS, more magnetic material may be contained at the ABS without increasing the track width. Thus, performance of the pole 160 may be enhanced while maintaining a lower track width.

Figure 5A:
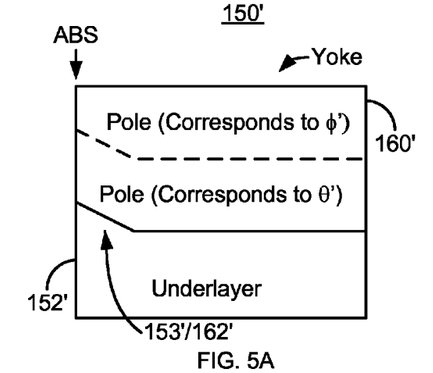
FIGS. 5A, 5B, 5C, 5D and 5E are side, ABS, bevel, top and alternate ABS views of another exemplary embodiment of a PMR transducer.
Figure 5B:
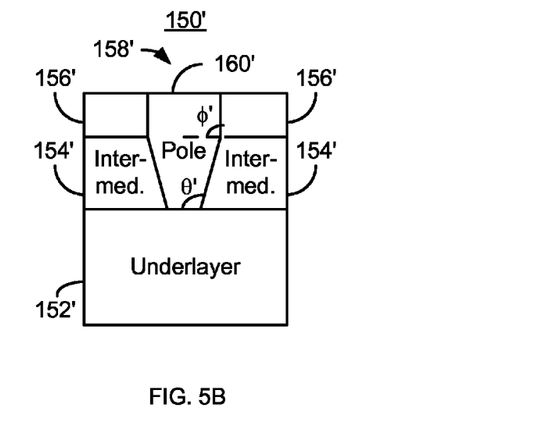
Figure 5C:
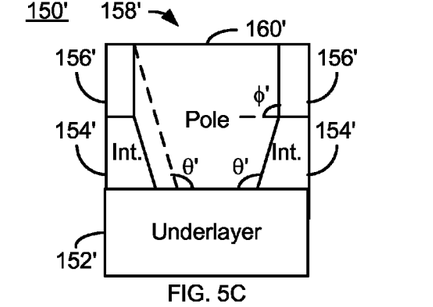
Figure 5D:
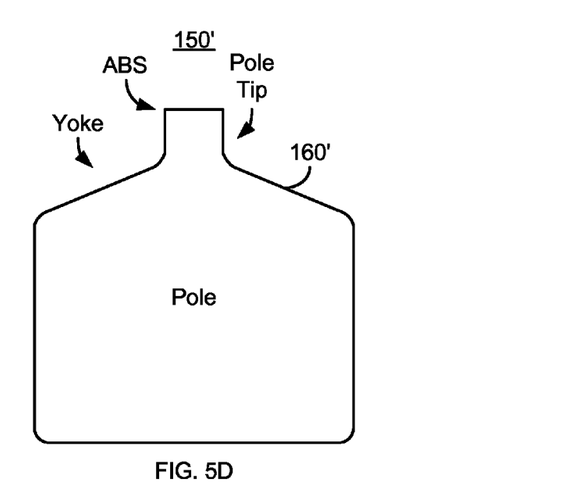
Figure 5E:
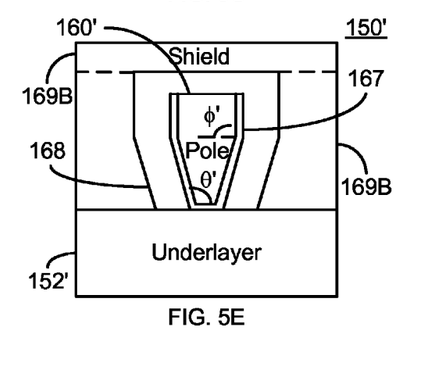

FIGS. 5A-5E are diagrams depicting another exemplary embodiment of a portion of a PMR transducer 150'. For clarity, FIGS. 5A-5E are not to scale. FIG. 5A depicts a side view of the transducer. FIG. 5B depicts the transducer 150' from the ABS, while FIG. 5C depicts the transducer 150' from the yoke. FIG. 5D is a top view of the transducer 150'. FIG. 5E is an ABS view of an embodiment the transducer 150' having a shield and write gap. The transducer 150' is analogous to the transducer 150. Thus, FIGS. 5A-5D depict an underlayer 152', an intermediate layer 154', a hard mask layer 156', a trench 158' and a pole 160' analogous to the underlayer 152, the intermediate layer 154, the hard mask layer 156, the trench 158 and the pole 160, respectively. The pole 160' has sidewall angles θ' and φ' in the yoke region. The material(s) and functions of the components 152', 153', 154', 156', 158', and 160' are analogous to those of the components 152, 153, 154, 156, 158, and 160, respectively. Although not shown in FIGS. 5A-5D, a seed layer may be used in forming the pole 160'. One embodiment of such a seed layer 167 is shown in FIG. 5E. Also shown in FIG. 5E is a nonmagnetic gap 168, an optional side shield 169A and optional trailing shield 169B that may be provided. In the embodiment shown, the entire pole 160' is within the trench 158'. However, in other embodiments, a portion of the pole 160' may be outside of the trench 158'.

The pole 160' is analogous to the pole 160. However, the pole 160' only has a bottom bevel 162' corresponding to the bevel 153' in the underlayer 152'. Thus, the pole 160' has multiple sidewall angles θ' and φ' at the ABS. In addition, the top surface of both the pole 160' and the hard mask layer 156' is perpendicular to the ABS.

The transducer 150' may share the benefits of the transducer 150. In particular, the transducer 150' may have an increased magnetic field and attendant improved ReOVW. The pole 160' may also have an improved magnetic field gradient, which may improve the SNR. In some embodiments, the off track field may be maintained. In addition, the pole 160' may have an increased pole tip magnetic volume, improve cross track magnetic anisotropy, and reduced domain lockup. Further, the transducer 150' is consistent with current fabrication techniques. In some embodiments, in which the pole 160' has multiple sidewall angles at the ABS, more magnetic material may be contained at the ABS without increasing the track width. Thus, performance of the pole may be enhanced while maintaining a lower track width.

Figure 6A:
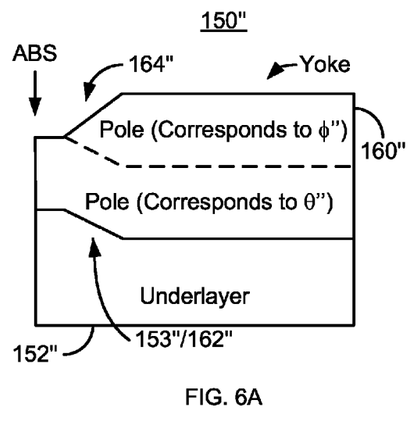
FIGS. 6A, 6B, 6C, and 6D are side, ABS, bevel and yoke views of an exemplary embodiment of a PMR transducer.
Figure 6B:
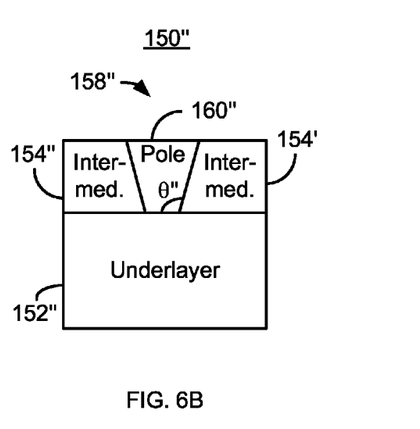
Figure 6C:
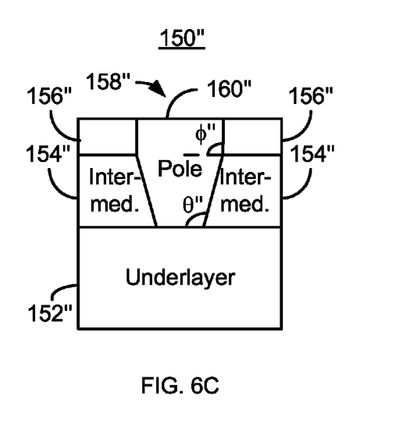
Figure 6D:
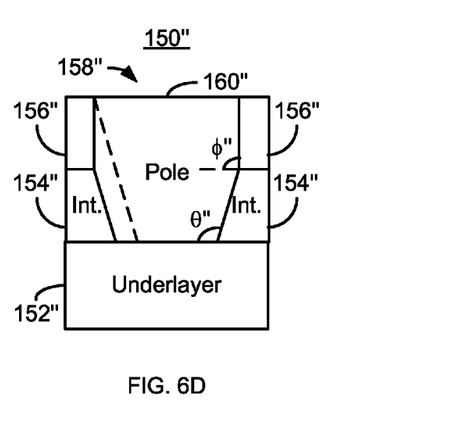
Figure 7A:
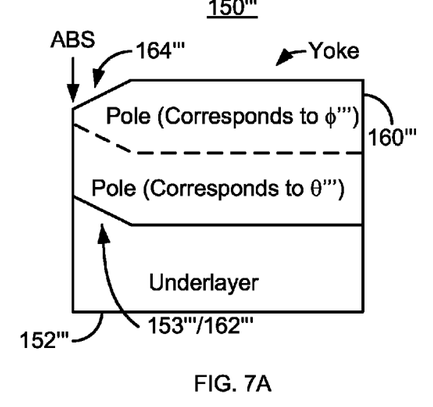
FIGS. 7A, 7B, 7C, and 7D are side, ABS, bevel and yoke views of an exemplary embodiment of a PMR transducer.
Figure 7B:
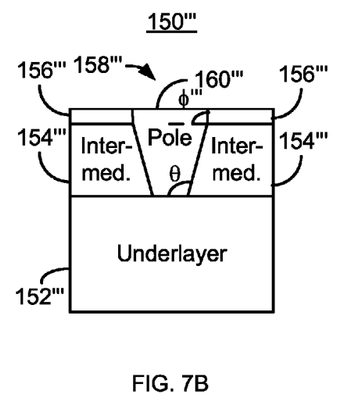
Figure 7C:
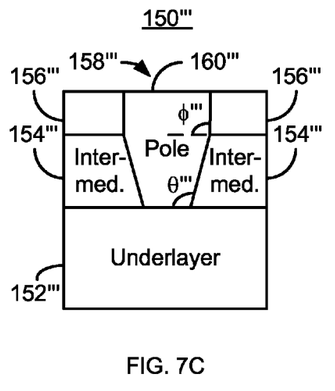
Figure 7D:
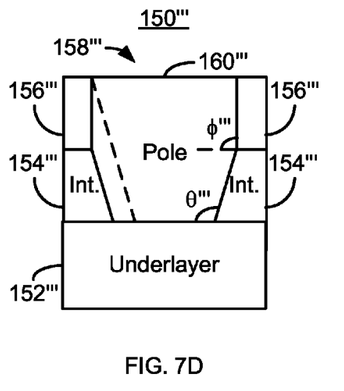
Figure 8A:
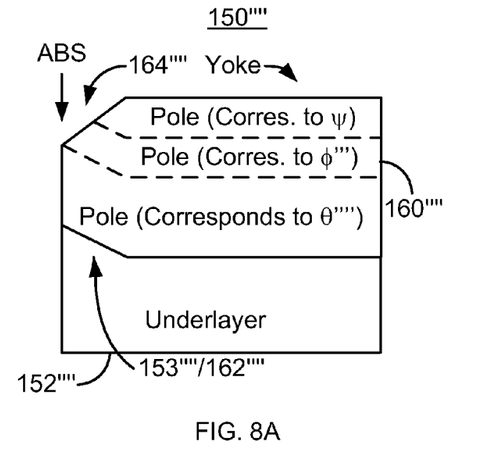
FIGS. 8A, 8B, 8C, and 8D are side, ABS, bevel and yoke views of an exemplary embodiment of a PMR transducer.
Figure 8B:
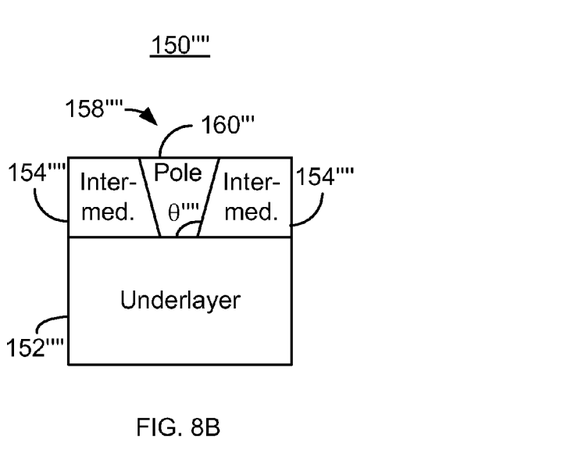
Figure 8C:
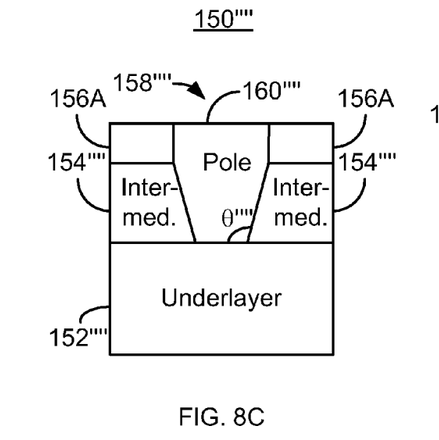
Figure 8D:
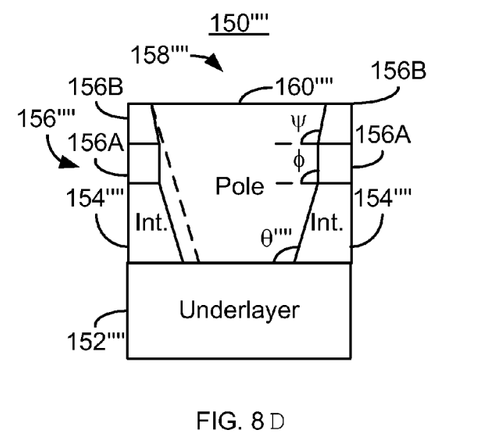

FIGS. 6A-6D are diagrams depicting another exemplary embodiment of a portion of a PMR transducer 150". For clarity, FIGS. 6A-6D are not to scale. FIG. 6A depicts a side view of the transducer 150". FIG. 6B depicts the transducer 150" from the ABS (i.e. is an ABS view). FIG. 6C depicts the transducer 150" from the bevel 153'/162' (i.e. is a bevel view). FIG. 6D depicts the transducer 150" from the yoke (i.e. is a yoke view). Because the yoke and pole tip regions of the transducer 150" are analogous to those of the transducers 150 and 150', a top view is not shown. The transducer 150" is analogous to the transducers 150 and 150'. Thus, FIGS. 6A-6D depict an underlayer 152" having a bevel 153", an intermediate layer 154", a hard mask layer 156", a trench 158" and a pole 160" analogous to the underlayer 152 having the bevel 153, the intermediate layer 154, the hard mask layer 156, the trench 158 and the pole 160, respectively. The pole 160'" includes bevels 162" and 164". The pole 160" has sidewall angles θ" and φ" in at least the yoke and bevel regions. The material(s) and functions of the components 152", 153", 154", 156", 158", 160", 162", and 164" are analogous to those of the components 152, 153, 154, 156, 158, 160, 162, and 164, respectively. Although not shown, a seed layer may be used in forming the pole 160". In the embodiment shown, the entire pole 160" is within the trench 158". However, in other embodiments, a portion of the pole 160" may be outside of the trench 158".

The pole 160" is analogous to the poles 160 and 160'. The pole 160" also has bevels 162" and 164" analogous to the bevels 162 and 164. However, the ABS is not within the bevel 152"/162" or the bevel 164". Instead, the pole 160" has substantially flat top and bottom close to the ABS. Thus, the height of the pole 160" may not change much if the transducer 150" is overlapped. Thus, the top and bottom surfaces the pole 160" are substantially perpendicular to the ABS.

The transducer 150" may share the benefits of the transducers 150 and 150'. In particular, the transducer 150" may have an increased magnetic field and attendant improved ReOVW. The pole 160" may also have an improved magnetic field gradient, which may improve the SNR. In some embodiments, the off track field may be maintained. In addition, the pole 160" may have an increased pole tip magnetic volume, improved cross track magnetic anisotropy, and reduced domain lockup. Further, the transducer 150" is consistent with current fabrication techniques. In some embodiments, in which the pole 160" has multiple sidewall angles at the ABS, more magnetic material may be contained at the ABS without increasing the track width. Thus, performance of the pole may be enhanced while maintaining a lower track width.

FIGS. 7A, 7B, 7C, and 7D are diagrams depicting side, ABS, bevel, and yoke views of another exemplary embodiment of a portion of a PMR transducer 150'". For clarity, FIGS. 7A-7D are not to scale. Because the yoke and pole tip regions of the transducer 150'" are analogous to those of the transducers 150 and 150', a top view is not shown. The transducer 150'" is analogous to the transducers 150, 150' and 150". Thus, FIGS. 7A-7D depict an underlayer 152'" having a bevel 153'", an intermediate layer 154'", a hard mask layer 156'", a trench 158'" and a pole 160'" analogous to the underlayer 152 having the bevel 153, the intermediate layer 154, the hard mask layer 156, the trench 158 and the pole 160, respectively. The pole 160'" includes bevels 162'" and 164'". The pole 160'" has sidewall angles θ'" and φ'" in at least the yoke and bevel regions. The material(s) and functions of the components 152'", 153'", 154'", 156'", 158'", 160'", 162'", and 164'" are analogous to those of the components 152, 153, 154, 156, 158, 160, 162, and 164, respectively. Although not shown, a seed layer may be used in forming the pole 160'". In the embodiment shown, the entire pole 160'" is within the trench 158'". However, in other embodiments, a portion of the pole 160'" may be outside of the trench 158'".

The pole 160'" is analogous to the poles 160, 160', and 160". The pole 160'" also has bevels 162'" and 164'" analogous to the bevels 162 and 164. The pole 160'" has sidewall angles θ'" and φ'". However, the transducer 150'" is configured such that the ABS exposes both a portion of the pole 160'" corresponding to the intermediate layer 154'" and a portion of the pole 160'" corresponding to the hard mask layer 160'". As a result, the pole 160" has two angles θ'" and φ" not only in the yoke region and bevel region, but also at the ABS.

The transducer 150'" may share the benefits of the transducers 150, 150', and 150". In particular, the transducer 150'" may have an increased magnetic field and attendant improved ReOVW. The pole 160'" may also have an improved magnetic field gradient and improved SNR. In some embodiments, the off track field may be maintained. In addition, the pole 160'" may have an increased pole tip magnetic volume, improved cross track magnetic anisotropy, and reduced domain lockup. Further, the transducer 150'" is consistent with current fabrication techniques. In some embodiments, in which the pole 160'" has multiple sidewall angles at the ABS, more magnetic material may be contained at the ABS without increasing the track width. Thus, performance of the pole may be enhanced while maintaining a lower track width.

FIGS. 8A, 8B, 8C, and 8D are diagrams depicting side, ABS, bevel, and yoke views of another exemplary embodiment of a portion of a PMR transducer 150''''. For clarity, FIGS. 8A-8D are not to scale. Because the yoke and pole tip regions of the transducer 150'''' are analogous to those of the transducers 150 and 150', a top view is not shown. The transducer 150'''' is analogous to the transducers 150, 150', 150'', and 150'''. Thus, FIGS. 8A-8D depict an underlayer 152'''' having a bevel 153'''', an intermediate layer 154'''', a hard mask layer 156'''', a trench 158'''' and a pole 160'''' analogous to the underlayer 152 having the bevel 153, the intermediate layer 154, the hard mask layer 156, the trench 158 and the pole 160, respectively. The pole 160'''' includes bevels 162'''' and 164''''. The pole 160'''' has sidewall angles θ'''' and φ'''' in at least the yoke and bevel regions. The material(s) and functions of the components 152'''', 153'''', 154'''', 156'''', 158'''', 160'''', 162'''', and 164'''' are analogous to those of the components 152, 153, 154, 156, 158, 160, 162, and 164, respectively. Although not shown, a seed layer may be used in forming the pole 160''''. In the embodiment shown, the entire pole 160'''' is within the trench 158''''. However, in other embodiments, a portion of the pole 160'''' may be outside of the trench 158'''.

The pole 160'''' has sidewall angles θ'''' and φ''''. In addition, the pole 160'''' has sidewall angle ψ in the yoke region and part of the bevel. In the embodiment shown, he sidewall angle ψ corresponds to the transition between the two hard mask layers 156A and 156B. However, the additional sidewall angle ψ may be formed for another reason. However, like the angle φ, the angle ψ is measured from a direction parallel to the bottom of the pole 160''''. The transducer 150'''' is configured such that the ABS exposes only a portion of the pole corresponding to the bottom sidewall angle θ. In a part of the bevel shown in FIG. 8C, only a portion of the pole 160'''' corresponding to the bottom sidewall angle θ and middle sidewall angle φ are shown. As a result, the pole 160'''' has two angles θ''' and φ'' not only in this portion of the bevel 162''''. Further from the ABS, however, the pole 160'''' has angles θ, φ, and ψ corresponding to layers 154, 156A, and 156B, respectively.

The transducer 150'''' may share the benefits of the transducers 150, 150', 150'', and 150'''. In particular, the transducer 150'''' may have an increased magnetic field and attendant improved ReOVW. The pole 160'''' may also have an improved magnetic field gradient and improved SNR. In some embodiments, the off track field may be maintained. In addition, the pole 160'''' may have an increased pole tip magnetic volume, improve cross track magnetic anisotropy, and reduced domain lockup. Further, the transducer 150'''' is consistent with current fabrication techniques. In some embodiments, in which the pole 160'''' has multiple sidewall angles at the ABS, more magnetic material may be contained at the ABS without increasing the track width. Thus, performance of the pole 160'''' may be enhanced while maintaining a lower track width.

Figure 9:
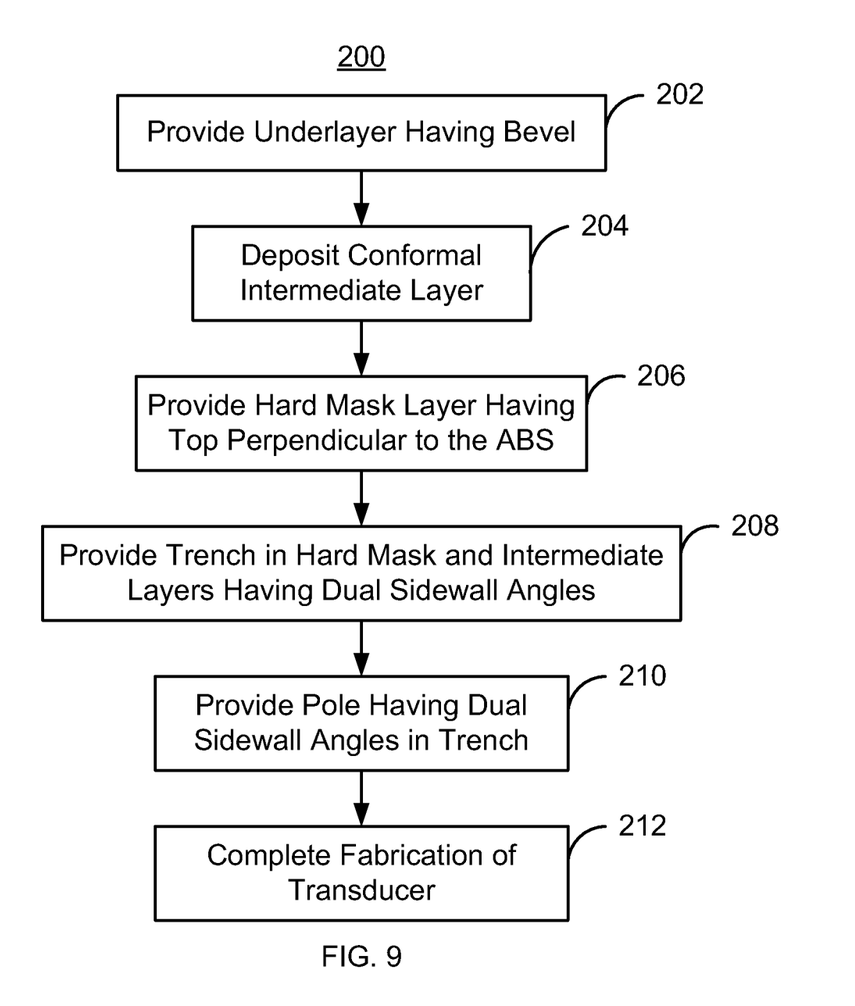
FIG. 9 is a flow chart depicting an exemplary embodiment of a method for fabricating a PMR transducer.

FIG. 9 is a flow chart depicting an exemplary embodiment of a method 200 for fabricating a transducer. The method 200 is described in the context of a PMR transducer 150, though other transducers might be so fabricated. For simplicity, some steps may be omitted, interleaved, and/or combined. The PMR transducer 150 being fabricated may be part of a merged head that also includes a read head (not shown) and resides on a slider (not shown) in a disk drive. The method 200 also may commence after formation of other portions of the PMR transducer. The method 200 is also described in the context of providing a single PMR pole and its associated structures in a single magnetic recording transducer. However, the method 200 may be used to fabricate multiple transducers at substantially the same time. The method 200 and system are also described in the context of particular layers. However, in some embodiments, such layers may include multiple sublayers. In one embodiment, the method 100 commences after formation of the layer(s) on which the PMR pole resides. The method 200 is discussed in the context of the intermediate layer 154 and the hard mask layer 156. However, in another embodiment, the pole 160 may be formed in another manner.

An underlayer 152 is provided, via step 202. The underlayer 152 has a bevel 153 and a thinner region corresponding to the yoke. In some embodiments, the underlayer 152 also has a region opposite to the yoke region that has substantially the same height as the top of the bevel 153. The bevel 153 is sloped at an angle greater than zero and less than ninety degrees from the ABS. Step 202 may include depositing the underlayer, masking a portion of the underlayer close to the location of the ABS, and milling the exposed portion of the underlayer at a milling angle corresponding to the desired slope. However, in other embodiments, step 202 may be performed in another manner.

An intermediate layer 154 is conformally deposited, via step 204. The intermediate layer 154 is thus substantially conformal with the underlayer 152. Stated differently, the top surface of the intermediate layer 154 has a topology that is substantially the same as the top surface of the underlayer 152. The thickness of the intermediate layer 154 is thus the same above the bevel 153, and the region of the underlayer 152 in the yoke region. The intermediate 154 is also nonmagnetic and, in some embodiments, insulating. In some embodiments, step 204 includes performing atomic layer deposition (ALD) of a material such as aluminum oxide. In some such embodiments, fast ALD (FALD) is used. The intermediate layer 154 may also be relatively thick. For example, in some embodiments, the thickness of the intermediate layer 154 is approximately 1300 Angstroms.

A hard mask layer 156 is provided on the intermediate layer 154, via step 206. The hard mask layer 156 has a top surface substantially perpendicular to the ABS. Thus, the topology of the top of the hard mask 156 is substantially flat even though the hard mask is above the bevel 153 and yoke region of the underlayer 152. The hard mask layer 156 provided in step 202 is desired to be removable using a different process than the intermediate layer 154. For example, materials such as Cr may be used for the hard mask layer 156 when the intermediate layer 154 is aluminum oxide. The hard mask layer 156 is also desired to be thick. For example, the portion of the hard mask layer 156 above the yoke region of the underlayer 152 may be on the order of 2600 Angstroms thick. Step 206 may be performed in a variety of ways. A portion of the intermediate layer 154 close to the ABS may be masked before deposition of the hard mask layer 156. This mask may then be removed, a planarization such as a CMP performed, and the region exposed by the mask refilled. Thus, a flat top surface of the hard mask layer 156 may be formed. In other embodiments, the hard mask layer 156 deposited and a planarization stop structure may be provided away from the region in which the pole is to be formed. A planarization such as a CMP may then be performed to provide the flat top surface of the hard mask layer 156. In still other embodiments a self-leveling deposition process might be able to be used. Further, in some embodiments, the hard mask layer 156 may have multiple sublayers. In such embodiments, each sublayer may serve as a hard mask for the layer below. Thus, these sublayers are also removable using different processes. Alternatively, the intermediate layer may be formed of multiple sublayers. In other embodiments, both the intermediate layer and the hard mask layer may include sublayers.

A portion of the hard mask layer 156 and the intermediate layer 154 is removed to provide a trench 158 therein, via step 208. The trench 158 has a bottom surface and sidewalls having multiple sidewall angles, θ and φ. Additional angles may also be provided using sublayers in the intermediate and/or hard mask layers. In other embodiments, a trench having multiple sidewall angles may be formed in another manner. Step 208 may include forming a photoresist mask on a portion of the hard mask layer corresponding to the trench, depositing an additional hard mask layer and removing the photoresist mask. Thus, an aperture corresponding to the trench is formed in the additional hard mask layer. One or more removal processes for the hard mask and intermediate layers may then be used. For example, a reactive ion etch (RIE) having a first etch chemistry may be used for the hard mask layer and a second RIE having a second etch chemistry may be used for the intermediate layer. Alternatively, other processes might be used for removing one or both of the hard mask and intermediate layers. If the intermediate and/or hard mask layer(s) include sublayers, then different removal processes may be used for each sublayer.

A pole 160 is provided, via step 210. At least a portion of the pole is in the trench formed in step 208. The pole has a pole tip proximate to the ABS, a yoke distal from the ABS, and a bottom bevel 162 corresponding to the bevel 153 in the underlayer. At least the yoke includes sidewalls, each of which has multiple sidewall angles corresponding to the angles θ and φ in the trench. Step 210 may include depositing a seed layer, depositing at least one magnetic pole layer, and planarizing the transducer. In some embodiments the seed layer may be magnetic, while in other embodiments, the seed layer may be nonmagnetic. The step of planarizing the transducer may include performing a CMP. Step 210 may also include forming a top, or trailing edge, bevel 164 in the pole 160. Thus, a pole 160, such as a perpendicular magnetic recording (PMR) pole may be formed. In some embodiments, the layers 154 and 156 around the pole 160 may be removed and a side gap and wraparound or side shield may also be formed.

Using the method 200, the PMR transducers 150, 150', 150", 150''', and 150'''' may be fabricated. Thus, the benefits of the PMR transducers 150, 150', 150", 150''', and 150'''' may be achieved.

What is claimed is:

1. A magnetic transducer having an air-bearing surface (ABS) comprising:
a pole having a pole tip proximate to the ABS, the pole including a yoke distal from the ABS, the pole having a bottom surface including a bottom bevel, the pole having a top surface opposite to the bottom surface, the pole including at least one sidewall separating the bottom surface and the to surface, the at least one sidewall having a first angle and a second angle, the first angle being between the bottom surface and the at least one sidewall, the second angle being separated from the bottom surface by a constant distance along the at least one sidewall such that a distance between the to surface and the second angle varies; and
at least one coil for energizing the pole.

2. The magnetic transducer of claim 1 wherein the first angle is at least ten degrees and not more than seventeen degrees from a direction normal to the bottom surface.

3. The magnetic transducer of claim 1 wherein the second angle is between a direction parallel to the bottom surface and a direction not less than five degrees from a direction normal to the bottom surface.

4. The magnetic transducer of claim 1 wherein the pole is is a write pole configured for perpendicular recording.

5. The magnetic transducer of claim 1 wherein the yoke and at least a portion of the pole tip include the first angle and the second angle.

6. The magnetic transducer of claim 1 wherein the at least one sidewall further includes a third angle.

7. The magnetic transducer of claim 6 wherein the yoke and at least a portion of the pole tip include the third angle.

8. The magnetic transducer of claim 1 wherein at least a portion of the pole tip at the ABS includes only the first angle.

9. The magnetic transducer of claim 1 wherein at least a portion of the pole tip at the ABS includes the first angle and the second angle.

10. The magnetic transducer of claim 1 further comprising:
a seed layer, the pole residing on the seed layer.

11. The magnetic transducer of claim 1 wherein the pole has a top surface, a first portion between the bottom surface and the second angle, and a second portion between the second angle and the top surface, the first portion having a constant thickness, and the second portion having a thickness varying between the pole tip and the yoke.

12. The magnetic transducer of claim 1 wherein the pole further includes a top bevel.

13. The magnetic transducer of claim 1 further comprising:
a side shield proximate to the ABS.

14. The magnetic transducer of claim 1 wherein the pole further includes a top surface, the magnetic transducer further comprising:
a write gap; and
a trailing shield having a portion proximate to the ABS, the write gap being between the top surface of the pole and the portion of the trailing shield.

15. The magnetic transducer of claim 1 further comprising:
a leading shield having a portion proximate to the ABS and the bottom surface of the pole.

16. A magnetic recording transducer having an air-bearing surface (ABS), the magnetic recording transducer comprising:
a seed layer;
a pole residing on the seed layer, the pole having a pole tip proximate to the ABS, the pole including a yoke distal from the ABS, the pole also having a bottom surface having a bottom bevel and a top surface opposite to the bottom surface, the top surface including a top bevel, the pole including at least one sidewall separating the bottom surface and the top surface, the at least one sidewall having a first angle and a second angle, the first angle being between the bottom surface and the at least one sidewall, the first angle being at least ten degrees and not more than seventeen degrees from a first direction normal to the bottom surface, the second angle being between the bottom surface and a second direction not less than five degrees from the normal to the bottom surface, the pole further having a first portion between the bottom surface and the second angle and a second portion between the second angle and the top surface, the first portion having a constant thickness such that the second portion has a thickness varying between the pole tip and the yoke;
a write gap;
a trailing shield, the write gap residing between a portion of the trailing shield proximate to the ABS and the pole tip; and
at least one coil for energizing the pole.

17. A disk drive comprising:
a media, a slider, and a magnetic transducer coupled with the slider, the magnetic transducer having air-bearing surface (ABS), a pole, and at least one coil, the pole having a pole tip proximate to the ABS, the pole including a yoke distal from the ABS, the pole also having a bottom surface including a bottom bevel and a top surface opposite to the bottom surface, the pole including at least one sidewall separating the bottom surface and the to surface, the at least one sidewall having a first angle and a second angle, the first angle being between the bottom surface and the at least one sidewall, the second angle being separated from the bottom surface by a constant distance along the at least one sidewall such a distance between the top surface and the bottom surface varies, the at least one coil for energizing the pole.

* * * * *